(12) United States Patent
Huang

(10) Patent No.: US 9,184,610 B2
(45) Date of Patent: Nov. 10, 2015

(54) DUAL MODE CHARGING DEVICE

(75) Inventor: Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 707 days.

(21) Appl. No.: 13/563,975

(22) Filed: Aug. 1, 2012

(65) Prior Publication Data

US 2013/0147422 A1 Jun. 13, 2013

(30) Foreign Application Priority Data

Dec. 12, 2011 (TW) .............................. 100145713 A

(51) Int. Cl.

| | |
|---|---|
| *H02J 7/00* | (2006.01) |
| *H01M 10/44* | (2006.01) |
| *H01M 10/46* | (2006.01) |
| *G02B 6/32* | (2006.01) |
| *H02J 7/35* | (2006.01) |
| *G02B 6/38* | (2006.01) |
| *G02B 6/42* | (2006.01) |

(52) U.S. Cl.
CPC ............. *H02J 7/0042* (2013.01); *H02J 7/0052* (2013.01); *H02J 7/0055* (2013.01); *H02J 7/35* (2013.01); *H02J 7/355* (2013.01); *G02B 6/3817* (2013.01); *G02B 6/4298* (2013.01); *H02J 2007/0059* (2013.01)

(58) Field of Classification Search
CPC ..... H02J 7/0055; H02J 7/0052; H02J 7/0042; H02J 7/0044
USPC .............................. 320/101, 114–115; 385/33
See application file for complete search history.

(56) References Cited

U.S. PATENT DOCUMENTS

| | | | | |
|---|---|---|---|---|
| 5,075,615 | A * | 12/1991 | Dantis ........................... | 320/111 |
| 2007/0069684 | A1* | 3/2007 | Ramsden ....................... | 320/101 |
| 2008/0157712 | A1* | 7/2008 | Garcia .......................... | 320/101 |
| 2008/0216888 | A1* | 9/2008 | Miller et al. .................. | 136/246 |
| 2009/0056791 | A1* | 3/2009 | Pfenninger et al. ........... | 136/247 |
| 2009/0268439 | A1* | 10/2009 | Chen ............................. | 362/183 |

* cited by examiner

*Primary Examiner* — Richard Isla Rodas
*Assistant Examiner* — David V Henze-Gongola
(74) *Attorney, Agent, or Firm* — Novak Druce Connolly Bove + Quigg LLP

(57) ABSTRACT

A charging device for charging an electronic device includes a plug module and an interface module. The plug module includes a plug portion, two connecting portions formed on a side of the plug portion, two first electrical wires positioned in the connecting portions, two condenser lenses, two first optical fibers, two first transmitting lenses. The first optical fibers connect the first transmitting lenses to the condenser lens. The interface module includes a main body, two positioning portions formed on a side of the main body, two second electrical wires extending the positioning portions; two second optical fibers, two second transmitting lenses, and a photoelectric conversion chip. The second optical fibers connect the second transmitting lenses to the photoelectric conversion chip. The first transmitting lenses are aligned with the second transmitting lenses.

9 Claims, 3 Drawing Sheets

DUAL MODE CHARGING DEVICE

BACKGROUND

1. Technical Field

The present disclosure generally relates to charging devices, and particularly, to a charging device with a light energy charging mode and an electricity charging mode.

2. Description of the Related Art

A portable electronic device, such as a mobile phone, generally has a battery to supply electricity. After a user uses the mobile phone for a period of time, the battery is exhausted, and then the user needs to recharge the battery. However, the battery is usually charged in the case of a fixed power charger only, which thereby causes great inconvenience to prolonged outdoor operations of the portable electronic device.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
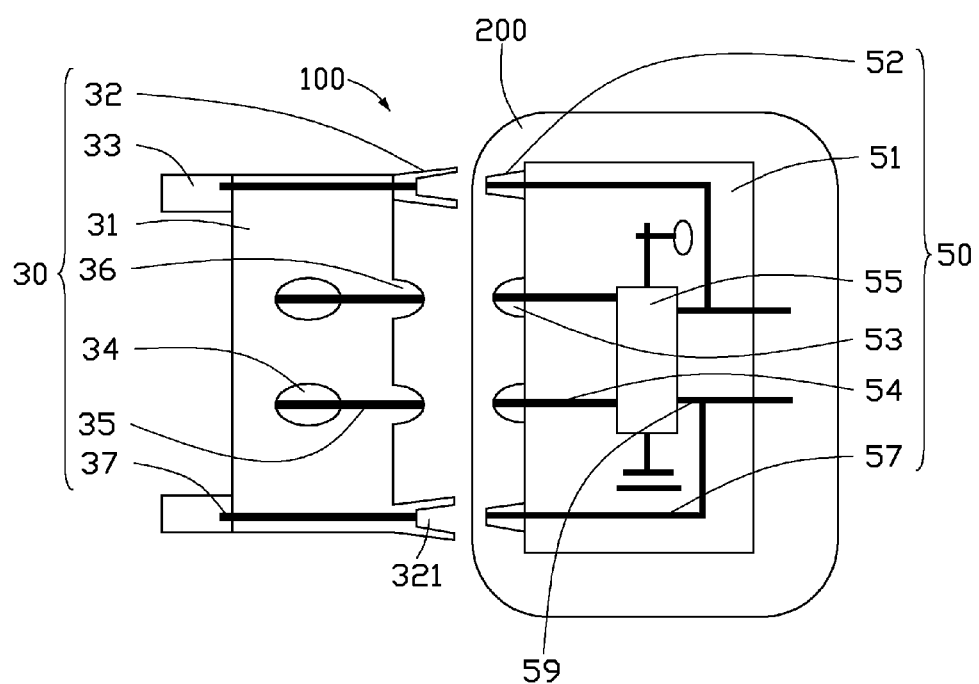
FIG. 1 is a schematic view of an embodiment of a charging device used for charging an electronic device.

FIG. 1 illustrates an embodiment of a charging device 100. The charging device 100 is used for charging an electronic device 200. The charging device 100 includes a plug module 30 and an interface module 50 matched with the plug module 30. The interface module 50 is positioned in the electronic device 200.

Figure 3:
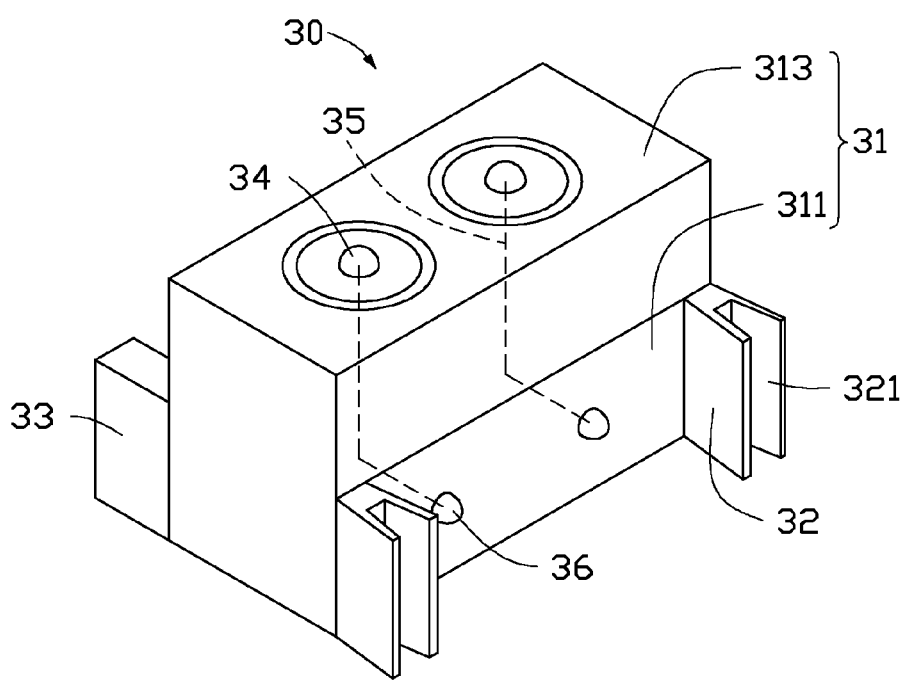
FIG. 3 is an isometric view of a plug module of the charging device of FIG. 2.

Referring to FIG. 3, the plug module 30 is used for transmitting electricity and light to the interface module 50. The plug module 30 includes a plug portion 31, two connecting portions 32, two insert pins 33, two condenser lenses 34, two first optical fibers 35, two first transmitting lenses 36, and two first electrical wires 37. The plug portion 31 is substantially rectangular, and includes a first positioning surface 311 and a second positioning surface 313 substantially perpendicular to the first positioning surface 311. The first transmitting lenses 36 are positioned on the first positioning surface 311, and the condenser lenses 34 are positioned on the second positioning surface 313. The connecting portions 32 are positioned on opposite ends of the first positioning surface 311. Each connecting portion 32 defines a positioning groove 321. The insert pins 33 and the connecting portions 32 are positioned on opposite sides of the plug portion 31. The insert pins 33 are connected to an external electricity power source (not shown) for transmitting electricity to the plug module 30. The condenser lenses 34 are positioned on the second positioning surface 313 for gathering and condensing light. In an illustrated embodiment, the condenser lenses 34 are Fresnel lenses.

The first optical fibers 35 are positioned in the plug portion 31, in which one end of the first optical fibers 35 is optically coupled to the condenser lenses 34, and the other end of the first optical fibers 35 is optically coupled to the first transmitting lenses 36. The first electrical wires 37 are positioned in the plug portion 31, in which one end of the first electrical wires 37 is positioned in the connecting portions 32, and the other end of the first electrical wires 37 is positioned in the insert pins 33. Therefore, the first electrical wires 37 electrically connect the insert pins 33 to the connecting portions 32, respectively.

Figure 2:
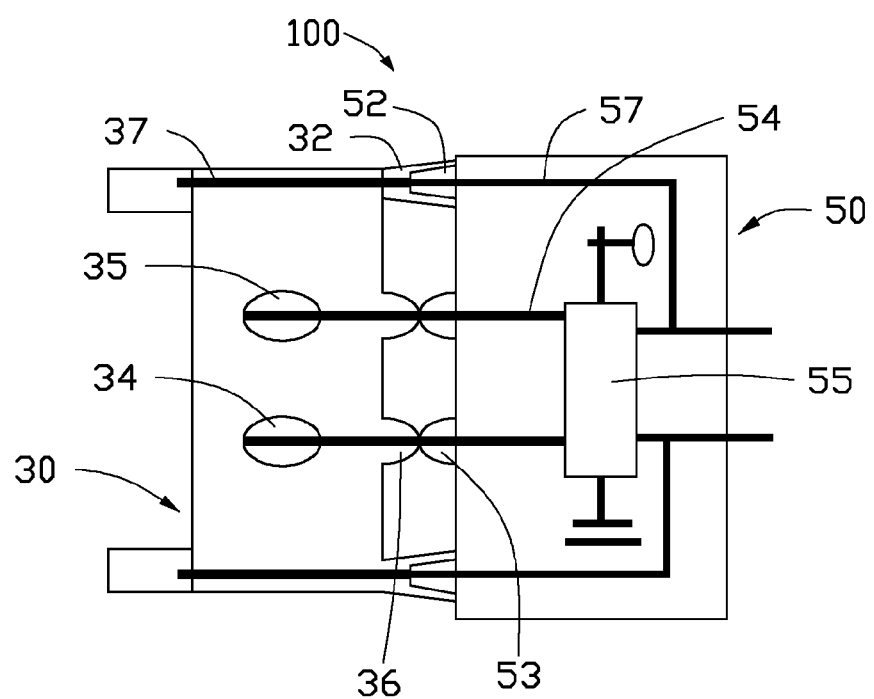
FIG. 2 is a schematic view of the charging device of FIG. 1.

Referring to FIGS. 1 through 3, the interface module 50 is positioned on the electronic device 200, and includes a main body 51, two positioning portions 52, two second transmitting lenses 53, two second optical fibers 54, a photoelectric conversion chip 55, and two second electrical wires 57. The positioning portions 52 are opposite to each other, and are formed on a side surface of the main body 51. The positioning portions 52 are engaged in the positioning grooves 321 of the connecting portions 32. The second transmitting lenses 53 are positioned on the side surface of the main body 51, and aligned with the first optical fibers 35 of the plug module 30 for transmitting light.

The second optical fibers 54 are positioned in the main body 51, in which one end of the second optical fibers 54 is optically coupled to the second transmitting lenses 53, and the other end of the second optical fibers 54 is connected to the photoelectric conversion chip 55. The photoelectric conversion chip 55 is positioned in the main body 51, and used for transferring light energy to electricity to charge the electronic device 200. The photoelectric conversion chip 55 is connected to an energy storage unit (not shown) via a plurality of conductive wires 59. The second electrical wires 57 are positioned in the main body 51, in which one end of the second electrical wires 57 extends through the positioning portions 52, and the other end of the second electrical wires 57 is connected to the conductive wires 59.

In use, the positioning portions 52 of the interface module 50 are engaged in the positioning grooves 321 of the plug module 30, therefore, the first electrical wires 37 are electrically connected to the second electrical wires 57, and the second transmitting lenses 53 are aligned with the first transmitting lenses 36 of the plug module 30. During the day, the condenser lenses 34 condenses the outside light, and transmits light energy to the first transmitting lenses 36 via the first optical fibers 35. Then, the first transmitting lenses 36 transmit light energy to the second transmitting lenses 53, and the second transmitting lenses 53 transmit light energy to the photoelectric conversion chip 55 via the second optical fibers 54. The photoelectric conversion chip 55 transfers light energy to electricity to charge the electronic device 200. During the night, the insert pins 33 are connected to the external electricity power source, and thus the electronic device 200 is charged by the electricity transmitted on the first electrical wires 37, the second electrical wires 57, and the conductive wires 59.

As above described, the electronic device 200 can be charged by light energy during the day and by the external electricity power source during the night via the charging device 100. That is, the charging device 100 has a light energy charging mode and an electric charging mode. When the user is in outdoor operations, the user can use the charging device 100 under the light energy charging mode. It should be pointed out that the charging device 100 can be used under both the light energy charging mode and the electric charging mode simultaneously.

In alternative embodiments, the positioning portions 52 may be grooves, and the connecting portions 32 are corresponding protrusions. Furthermore, the number of the condenser lenses 34, the first optical fibers 35, the first transmitting lenses 36, the second optical fibers 54, and the second transmitting lenses 53 may be one or more than two.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A charging device for charging an electronic device, comprising:
   a plug module comprising a plug portion and two connecting portions formed on a side of the plug portion, a first electrical wire positioned in each of the connecting portions; and
   an interface module comprising a main body and two positioning portions formed on a side of the main body, a second electrical wire extending through each of the positioning portions; the positioning portions engaged with the connecting portions, thereby electrically connecting the first electrical wires to the second electrical wires;
   wherein the plug module further comprises at least one condenser lens, at least one first optical fiber, at least one first transmitting lens, and the at least one first optical fiber connects the at least one first transmitting lens to the at least one condenser lens; the interface module further comprises at least one second optical fiber, at least one second transmitting lens, and a photoelectric conversion chip, and the at least one second optical fiber connects the at least one second transmitting lens to the photoelectric conversion chip; the at least one first transmitting lens is aligned with the at least one second transmitting lens.

2. The charging device of claim 1, wherein the plug portion comprises a first positioning surface and a second positioning surface substantially perpendicular to the first positioning surface; the at least one first transmitting lens is positioned on the first positioning surface, and the at least one condenser lens is positioned on the second positioning surface.

3. The charging device of claim 1, wherein the connecting portion define positioning grooves for receiving the positioning portions of the interface module.

4. The charging device of claim 1, wherein the plug module further comprises a plurality of insert pins formed on the plug portion, and the insert pins and the connecting portions are positioned on opposite sides of the plug portion; the insert pins are connected to the first electrical wires, respectively.

5. The charging device of claim 1, further comprising two conductive wires connected to the photoelectric conversion chip.

6. A plug module, comprising:
   a plug portion; and
   two connecting portions formed on a side of the plug portion, an electrical wire positioned in each of the connecting portions;
   wherein the plug module further comprises at least one condenser lens, at least one first optical fiber, at least one first transmitting lens, and the at least one first optical fiber connects the at least one first transmitting lens to the at least one condenser lens;
   wherein the plug portion comprises a first positioning surface and a second positioning surface substantially perpendicular to the first positioning surface; the at least one first transmitting lens is positioned on the first positioning surface, and the at least one condenser lens is positioned on the second positioning surface.

7. The plug module of claim 6, further comprising a plurality of insert pins formed on the plug portion, wherein the insert pins and the connecting portions are positioned on opposite sides of the plug portion, and the insert pins are connected to the first electrical wires, respectively.

8. An interface module, comprising:
   a main body; and
   two positioning portions formed on a side of the main body, and an electrical wire extending through each of the positioning portions;
   wherein the interface module further comprises at least one second optical fiber, at least one second transmitting lens, and a photoelectric conversion chip, and the at least one second optical fiber connects the at least one second transmitting lens to the photoelectric conversion chip;
   wherein the second transmitting lens is aligned via the positioning portions with a first transmitting lens connected to a first optical fiber on a plug module.

9. The interface module of claim 8, further comprising two conductive wires connected to the photoelectric conversion chip.

* * * * *